US006168662B1

(12) United States Patent
Duffy et al.

(10) Patent No.: US 6,168,662 B1
(45) **Date of Patent: *Jan. 2, 2001**

(54) POWDER DISCHARGE APPARATUS AND METHOD FOR USING THE SAME

(75) Inventors: Richard J. Duffy, Shelby Township; Eugene Sessa, Harrison Township, both of MI (US)

(73) Assignee: Nylok Fastener Corporation, Macomb, MI (US)

( * ) Notice: Under 35 U.S.C. 154(b), the term of this patent shall be extended for 0 days.

This patent is subject to a terminal disclaimer.

(21) Appl. No.: 09/154,480

(22) Filed: Sep. 16, 1998

Related U.S. Application Data

(63) Continuation of application No. 08/887,491, filed on Jul. 2, 1997, now Pat. No. 5,908,155.

(51) Int. Cl.[7] .......... A01C 17/00

(52) U.S. Cl. .......... 118/308

(58) Field of Search .......... 239/673, 675, 239/682, 111, 672; 141/237–241; 29/453, 297, 176; 411/508, 900, 901, 406; 118/308

(56) References Cited

U.S. PATENT DOCUMENTS

| | | | |
|---|---|---|---|
| 2,770,212 | 11/1956 | Marantz . | |
| 3,777,874 | 12/1973 | Birckhead . | |
| 4,762,437 * | 8/1988 | Mitomi | 403/406.1 |
| 5,248,542 | 9/1993 | Soderlund . | |

FOREIGN PATENT DOCUMENTS

| | | | |
|---|---|---|---|
| 711173 * | 9/1941 | (DE) | 239/654 |
| 3331169 * | 3/1985 | (DE) . | |
| 237927 * | 9/1987 | (EP) . | |
| 1428682 | 3/1965 | (FR) . | |
| 1428682 | 5/1966 | (FR) . | |
| 1185406 | 3/1970 | (GB) . | |
| 1692331 * | 11/1991 | (SU) . | |

OTHER PUBLICATIONS

Publication No. EP 0 914 872 A3 dated Dec. 8, 1999 of European Patent Application No. 98650036.1 including Europen Search Report.

* cited by examiner

*Primary Examiner*—Kevin Weldon
(74) *Attorney, Agent, or Firm*—Niro, Scavone, Haller & Niro

(57) ABSTRACT

An apparatus and method for use with powdered resin feeders that provide a continuous stream of powder to a plurality of spray nozzles for the application of powder to a plurality of work-pieces. In one preferred embodiment, the apparatus converts a single powder stream into a plurality of uniform powder streams through the use of a multi-tiered system having dividers and receptacles that accurately divide a single powder stream into a plurality of powder streams. In another preferred embodiment, a double-ended stud having ends with differing break-away torques may be created by the device's ability to distribute different amounts of powder to the spray nozzles.

20 Claims, 3 Drawing Sheets

POWDER DISCHARGE APPARATUS AND METHOD FOR USING THE SAME

This application is a continuation of U.S. patent application Ser. No. 08/887,491, filed on Jul. 2, 1997 and now issued as U.S. Pat. No. 5,908,155.

BACKGROUND OF THE INVENTION

The present invention relates to a powder feeding apparatus. More specifically, the invention relates to an apparatus and method which convert a powder flow stream originating from a single source into one or more continuous powdered resin streams.

When powdered resins are fused to articles such as fasteners to enhance their frictional engagement and to create self-locking fasteners, it is important to uniformly coat each individual fastener with an equivalent amount of powder. A uniform coating ensures that each individual fastener of a batch of processed fasteners will display the same performance characteristics which may include, among others, the same locking and torquing characteristics. Thus, improvements in the even distribution of powdered resins directly enhance the performance and quality of the fasteners to which the powdered resins are applied.

Prior art approaches that attempt to improve the uniform distribution of powdered resins to a system's spray nozzles are disclosed in U.S. Pat. Nos. 4,815,414 and 5,571,323. U.S. Pat. No. 4,815,414 discloses a system which uses a conical surface to direct the powder stream into a plurality of troughs for channeling the powder to the spray nozzels. U.S. Pat. No. 5,571,323 teaches using an adjustable metering valve, among other structure, for controlling the amount of powdered resin supplied to the spray nozzles.

Accordingly, an object of the present invention is to provide an apparatus and method that are capable of converting a single powdered resin stream into a plurality of uniform powdered resin streams.

SUMMARY OF THE INVENTION

This and other objects are provided by the present invention which provides an apparatus that uniformly distributes powder to a plurality of spray nozzles. In one embodiment of the present invention, a single powdered resin stream is converted into a plurality of uniform powder streams for application by a plurality of spray nozzles through a multi-tiered apparatus. The apparatus of this embodiment comprises a powdered resin reservoir that meters powdered resin through a discharge port down onto a first receptacle that includes a hopper for receiving the falling powder and a passageway that discharges the powdered resin received down onto a divider located on a second receptacle. The divider then uniformly divides the stream into two equivalent streams that may be conveyed directly to a set of spray nozzles for application to the work-pieces or further divided by a similarly constructed third receptacle that divides the two powdered resin streams into four uniform streams through the use of two dividers and four hoppers.

In another embodiment, a weir is positioned to intersect the powder discharged by the powdered resin reservoir. The weir is used to eliminate any pulsing in the powdered resin stream.

In another embodiment, the present invention provides an apparatus that may be used to proportionally divide a single powdered resin stream into several different resin streams that contain differing amounts of powdered resin. Uses in which these types of processes may be used include, but are not limited to, the creation of double-ended studs having different break-away torques.

BRIEF DESCRIPTION OF THE DRAWINGS

These and other features, objects and advantages of the present invention will become apparent from the following description and drawings wherein like reference numerals represent like elements in the several views, and in which.

DETAILED DESCRIPTION OF THE PREFERRED EMBODIMENTS

With reference to the drawings, the apparatus of the present invention is illustrated in one preferred embodiment for the application of resin powder onto threaded fasteners. While the illustrated embodiment makes reference to a fastener, the present invention is useful in coating a wide variety of threaded or unthreaded articles such as screws, bolts, studs, nuts or collars. The present invention may also be employed to apply a variety of coatings in the form of a gas-borne powder stream. Such powders may include thermoplastic and thermosetting resins such as nylons, polyolefins, epoxies and teflons. In addition, the present invention expands and improves upon the powder dispensing system disclosed in our copending and commonly assigned application, U.S. Ser. No. 08/779,684, filed Jan. 7, 1997, which is incorporated by reference herein.

Figure 1:
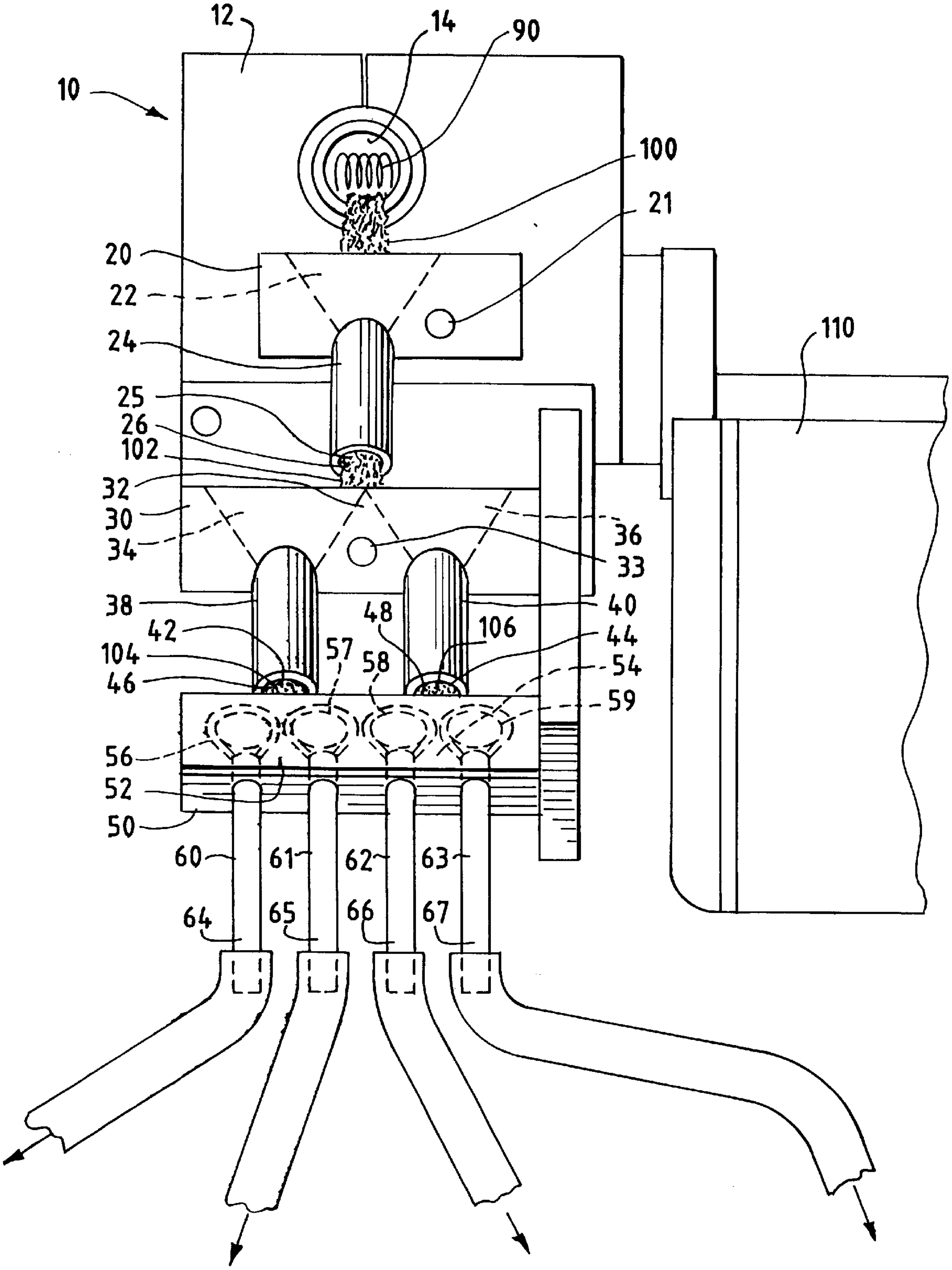
FIG. 1 is a front view of one preferred embodiment of the present invention.
Figure 2:
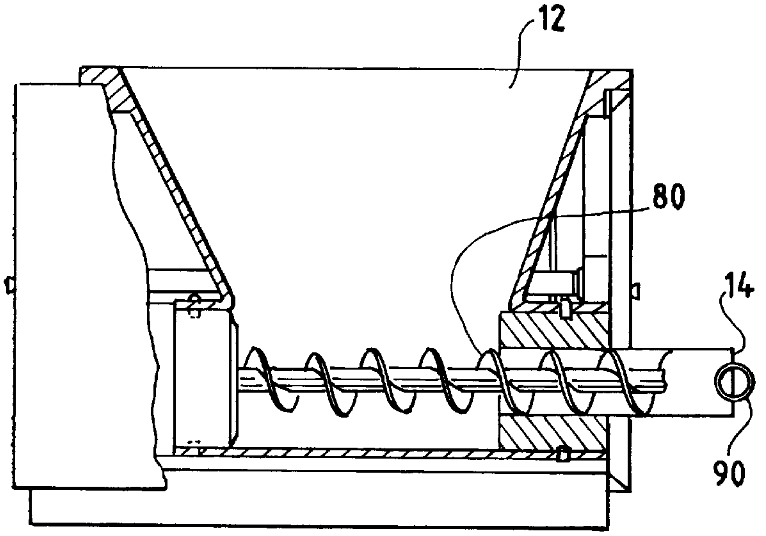
FIG. 2 is a side view of a resin reservoir with portions removed to show the modified helix feeder contained therein.

In accordance with a preferred embodiment shown in FIG. 1, powder feeding apparatus 10 includes a powdered resin reservoir 12 having a discharge port 14. As shown in FIG. 2, contained within reservoir 12 is a feeder 80 that conveys powdered resin through discharge port 14. As shown, feeder 80 may be a helix-type feeder 80 or some other type of known feeder. A preferred feeder is an Accu-Rate® volumetric powder metering unit, available from Schenck AccuRate of White Water, Wis. The AccuRate® feeder uses a helix to convey the resin powder through discharge port 14.

Powder flow streams may also be developed by a variety of other volumetric and/or gravimetric powder feeders. Examples are screw feeders, belt feeders, rotary valve feeders and louvered feeders, as well as loss-in-weight and gain-in-weight systems. Any of these systems, as well as other powder flow systems known to those of ordinary skill in the art, may be used with and are within the scope of the present invention.

Figure 3:
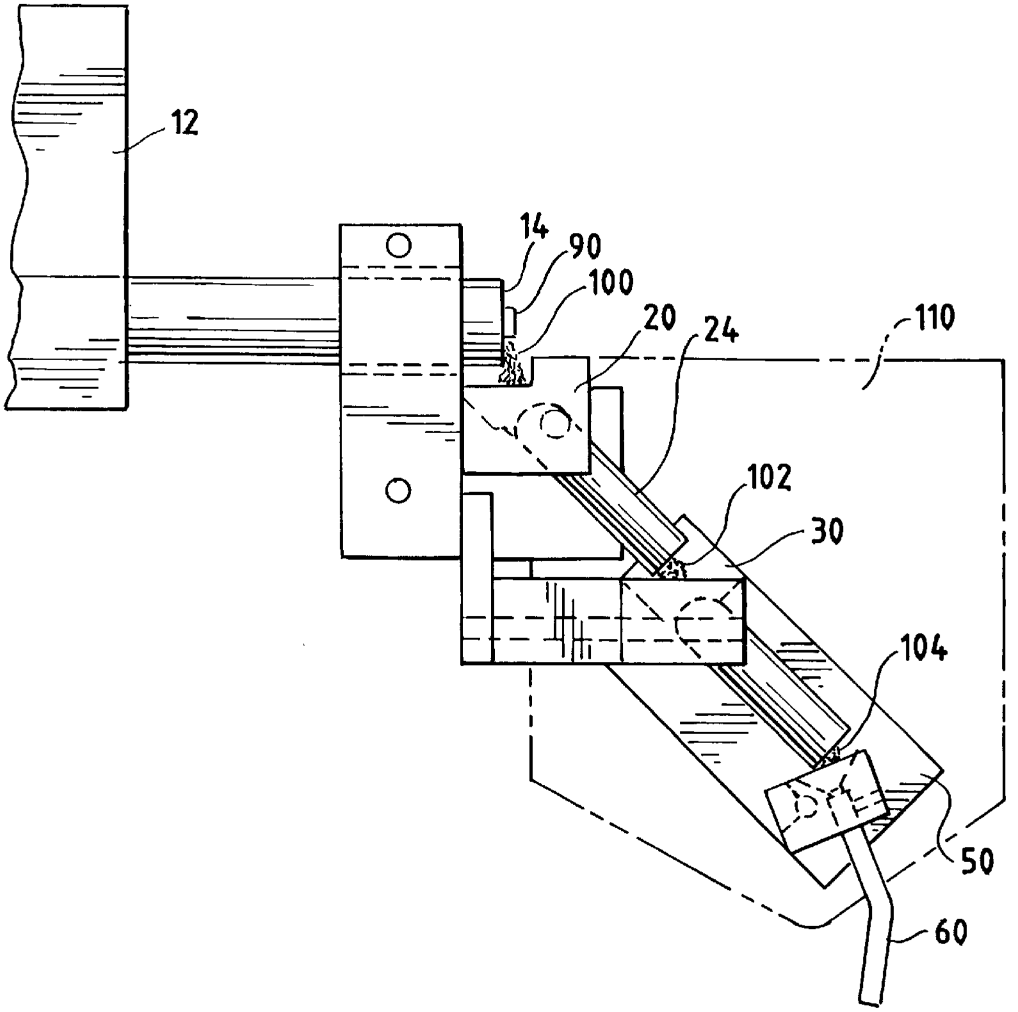
FIG. 3 is side view, in partial cross-section, of the embodiment shown in FIG. 1.

Referring now to FIGS. 1 and 3, a first receptacle 20 is positioned directly below discharge port 14. Receptacle 20 includes a hopper or opening 22 positioned to receive the powder discharged through port 14. Hopper 22 is in communication with tube 24, which defines a passageway 25 that terminates in a second discharge port 26. Powdered resin exits discharge port 26 as a second powdered resin stream 102.

A second receptacle 30 is positioned directly below second discharge port 26. Receptacle 30 includes a divider 32 that separates a first hopper or opening 34 and a second hopper or opening 36. Hopper 34 is in communication with tube 38, which defines a passageway 42 that terminates in discharge port 46. Resin exits port 46 as powdered resin stream 104. Hopper 36 is in communication with tube 40, which defines a passageway 44 that terminates in discharge port 48. Resin exits port 48 as powdered resin stream 106.

To convert powdered resin streams 104 and 106 into four powdered resin streams, a third receptacle 50 may be provided. As with receptacle 30, receptacle 50 includes dividers 52 and 54 which separate hoppers 56–59. Hoppers 56–59 are in communication with tubes 60–63, respectively, which define passageways 64–67. If additional powdered resin streams are desired, additional tiers of similarly constructed receptacles may be provided.

Passageways 64–67 can be connected to suitable structure to convey the powdered resin streams to the spray nozzles where the powder is applied to the work-pieces. For example, the air/powder block shown in FIGS. 4–6 of copending and commonly assigned U.S. Ser. No. 08/782,597, filed Oct. 10, 1996 now abandoned and incorporated by reference herein, may be used for this purpose. Thus, while gravity acts to draw the powdered resin through receptacles 20 and 30, a preferred manner in which to draw the powdered resin through receptacle 50 and to prepare it for spraying by thoroughly entraining the powder in the air stream is disclosed in this copending application.

Alternatively, receptacles 50, 30 and 20 may be encased, leaving hopper 22 exposed to the atmosphere, to assist gravity in moving the powder through the system more rapidly. Configuring the apparatus in this matter is helpful when spraying a large volume of powder.

Of course, if fewer nozzles are to be employed, persons of ordinary skill in the art will recognize that the above-described apparatus may be configured so that receptacle 20 is in direct communication with a spray nozzle. Alternatively, passageways 42 and 44 of receptacle 30 may also be in direct communication with a set of spray nozzles.

As is shown in FIG. 2, a helix feeder 80 is contained within reservoir 12. This feeder has a continuous helix conveyor that creates a pulse in the powder flow which results in the discharge of an irregular amount of powdered resin, on a per-revolution basis, through port 14. This results in an uneven application of powdered resin onto an article to be sprayed.

To solve this problem, it has been discovered that the introduction of a weir 90 in the path of powdered resin stream 100 (see FIG. 1) eliminates this irregular flow of powder. The weir partially restricts the powder flow thereby producing a small amount of back pressure that is sufficient to provide a continuous and uniform stream of powder to the spray nozzles. This, in turn, results in a uniform application of material onto the article.

Weir 90 preferably only causes a slight amount of back pressure in order to avoid powder packing inside the auger. The resulting blockage of powder may not only interrupt the powder flow, it may also damage the feeder itself.

As illustrated in FIG. 1, weir 90 can take the form of an ordinary spring that does not need to be stretched across discharge port 14. We have found that for use with a discharge port having a one inch diameter, a spring having an outside diameter of five sixteenths of an inch, made of thirty-thousandths wire, and having eight turns per inch is suitable for achieving the objects of our invention. All dimensions given herein will be inches.

The spring is affixed to the device by uncurling each end of the spring and clamping the ends to the device. The spring is mounted so that the centerline of the spring is positioned slightly below the centerline of the discharge port in an unstretched configuration.

In operation, as shown in FIGS. 1 and 2, feeder 80 conveys a stream of powder 100 through discharge port 14 and past weir 90. Weir 90, while permitting powder flow, also produces back pressure that compresses the powdered resin stream to convert the irregular flow created by the helix into a continuous, uniform flow of powder. This in turn creates, a first falling powder stream 100 that is continuously received by hopper 22 of receptacle 20. Gravity then causes the powdered resin to fall through passageway 25 where it is discharged by port 26 to create a second falling powdered resin stream 102 which falls upon divider 32 of receptacle 30.

Divider 32 uniformly splits powder stream 102 in half by diverting one-half of the stream to hopper 34 and the other half of the stream into hopper 36. The newly created powdered resin streams are then transported through passageways 42 and 44 where they are discharged through ports 46 and 48, respectively, to create falling powdered resin streams 104 and 106.

Powdered resin streams 104 and 106 then fall onto dividers 52 and 54, where the streams are further equally divided and directed into separate hoppers 56–59. The four resulting uniform powdered resin streams may then be conveyed by passageways 64–67 to additional receptacles for further distribution in the manner set forth above. Alternatively, passageways 64–67 may be configured to convey the powdered resin streams to four corresponding spray nozzles for application of powdered resin onto the articles. Persons of ordinary skill in the art will recognize that the present invention will also find useful application when an odd number of powdered resin streams are desired.

To help back pressure reduce pulsing of the powder at discharge, it is preferable to use a vibrator 110, as shown in FIG. 1. In addition, to accurately divide a stream of powder it should be of constant cross section and direction, and be correctly aimed at the divider. As shown in FIG. 3, these conditions are established by positioning tubes 24, 38 and 40 at an angle of about 30°–45° to the horizontal. Angling the tubes allows gravity to consolidate the powder stream by concentrating the stream at the bottom of the tube.

For high volume, four powder stream applications, tubes 24, 28 and 40 were sized at ⅝ OD×18 gage×2 long. For a smaller volume spray application, such as processing nuts, a 3/16 OD×0.016 wall×1¼ long tube worked satisfactorily.

In another application of the present invention, the amount of powdered resin that is distributed to the spray nozzles may be controlled and proportionally divided through the selective positioning of the passageways with respect to the devices they are located above. It has been found that at least one passageway may be rotated or pivoted to direct a greater proportion of the powdered resin stream to flow onto one side of the divider located below the discharge port of the passageway and into the corresponding hopper. This, in turn, provides an increased amount of powdered resin to the spray nozzle that is in communication with the hopper.

Figure 4:
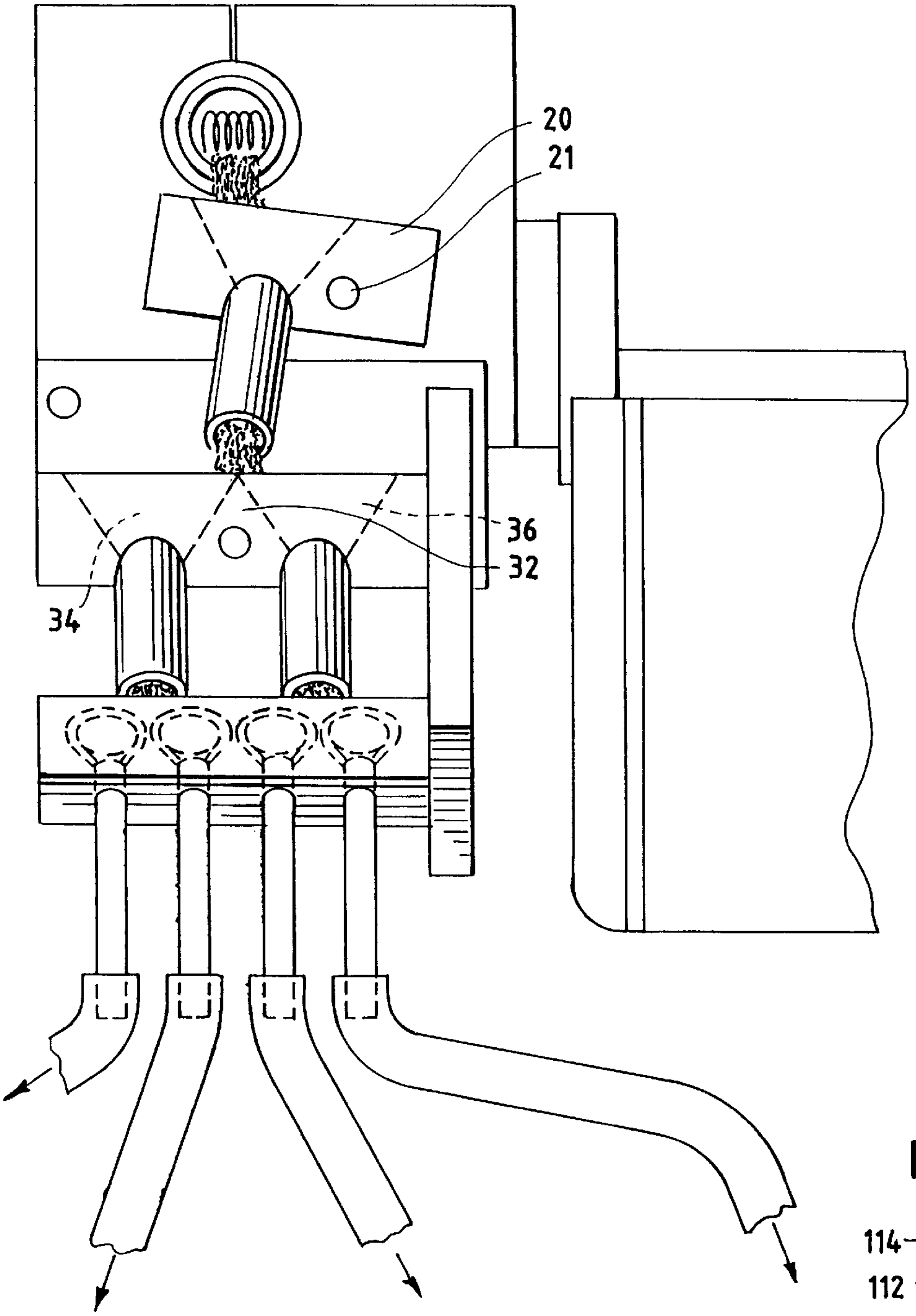
FIG. 4 is a front view of the embodiment shown in FIG. 1 showing how the distribution of powdered resin is controlled by the rotation of at least one passageway.

For example, as shown in FIG. 4, receptacle 20 may be rotated or pivoted about fastener 21 and towards hopper 34. This rotation directs a greater amount of the powder contained in powdered resin stream 102 down onto the side of divider 32 that feeds hopper 34. This, in turn, will result in powdered resin stream 104 having a greater proportion of powdered resin than powdered resin stream 106.

Of course, the device may be configured to create a greater proportion of powder in powdered resin stream 106 by reversing the procedure described above and having hopper 36 receive a proportionally greater share of powder from powdered resin stream 102. This same procedure may also be performed further along in the system at receptacle 30 or at any other point where a powdered resin stream is directed down onto a divider. Alternatively, the divider may be adjustably positioned with respect to the passageway and corresponding discharge port. By configuring our device in a manner described above, an operator may adjust the amounts of powdered resin flowing to each individual spray nozzle used by the system.

Figure 5:
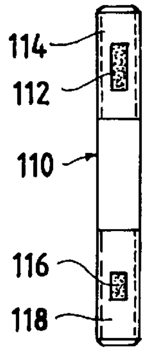
FIG. 5 is a front view of a double-ended stud manufactured by one preferred embodiment of the present invention.

The ability to deliver different amounts of powdered resin to each spray nozzle may be used to create a double-ended stud that has two torque zones, with each zone having a different installation or break-away torque. As shown in FIG. 5 and using the methods described above, a double-ended stud 110 may be created wherein self-locking patch 112 of end 114 has a greater amount of powdered resin than patch 116 of end 118. As will be appreciated by those of skill in the art, the greater amount of material applied to patch 112 will cause the break-away torque value for end 114 to be greater than the break-away value for end 118.

The ability to deliver different amounts of powdered resin to each spray nozzle may also be used in applications where it is desirable to apply successively larger or smaller amounts of powdered resin to a work piece. Thus, given the invention's ability to deliver successively larger or smaller amounts of identical powdered resin to the spray nozzles, additional layers of larger or smaller amounts of material may be applied to a work piece, as compared with systems that deliver a constant amount of powdered resin to the spray nozzles.

While the preferred embodiments of the present invention have been illustrated and described, it will be understood by those of ordinary skill in the art that changes and other modifications can be made without departing from the invention in its broader aspects, as described in the following claims.

What is claimed is:

1. An apparatus for creating a plurality of powdered resin streams for application by a plurality of spray nozzles, comprising:

a powder reservoir having a discharge port from which a first falling powdered resin stream emerges;

a first receptacle positioned below said discharge port, said first receptacle adapted to receive said first falling powdered resin stream;

a passageway in communication with said first receptacle, said passageway receiving powdered resin from said first receptacle and creating a second falling powdered resin stream by discharging said powdered resin stream through a discharge port;

a second receptacle having a divider positioned between a plurality of openings, said openings being in communication with a corresponding plurality of passageways; and said second receptacle positioned such that said second powdered resin stream impinges upon said divider and is divided into at least two powdered resin streams, whereby said powdered resin streams are further conveyed through said apparatus to said spray nozzles.

2. The apparatus of claim 1 further including a weir positioned to engage said powdered resin after said powdered resin emerges from said discharge port.

3. The apparatus of claim 2, wherein said weir is comprised of a spring.

4. The apparatus of claim 1, further comprising a vibrator for facilitating the flow of said powdered resin stream.

5. The apparatus of claim 1, wherein said passageways are angled to promote the flow of said powdered resin material.

6. The apparatus of claim 1, wherein said passageways are angled at about 30°–45° to the horizontal to promote the flow of said powdered resin material.

7. The apparatus of claim 1, wherein said powdered resin reservoir uses a feeder to create said first falling powdered resin stream.

8. The apparatus of claim 1, wherein said powdered resin reservoir uses a volumetric feeder to create said first falling powdered resin stream.

9. The apparatus of claim 1, wherein said powdered resin reservoir uses a gravimetric feeder to create said first falling powdered resin stream.

10. The apparatus of claim 1, wherein said passageway is adapted to be adjustably positioned with respect to said divider, and wherein said adjustable positioning of said passageway causes different proportions of powdered resin to flow into said hoppers.

11. The device of claim 1 wherein said second receptacle is positioned such that said second powdered resin stream impinges upon said divider and is divided into at least two uniform powdered resin streams.

12. A method for creating a plurality of powdered resin streams for application by a plurality of spray nozzles, comprising the steps of:

discharging powdered resin from a reservoir through a weir to create a first falling powdered resin stream;

positioning a receptacle below said first falling powdered resin stream, said receptacle having at least one divider and a plurality of openings, said divider positioned to receive said first powdered resin stream and configured to separate said first falling powdered resin stream into a plurality of powdered resin streams that are directed into said plurality of openings; and conveying said plurality of powdered resin streams into a plurality of passageways which are in communication with said spray nozzles.

13. The method of claim 12, wherein a vibrator is used to facilitate the flow of powdered resin material.

14. The method of claim 12, wherein said weir comprises a spring.

15. The method of claim 12, further comprising the step of angling said passageways relative to the horizontal to promote the flow of said powdered resin material.

16. The method of claim 12, wherein a feeder is used to create said first falling powdered resin stream.

17. The method of claim 12, wherein a volumetric feeder is used to create said first falling powdered resin stream.

18. The method of claim 12, wherein a gravimetric feeder is used to create said first falling powdered resin stream.

19. The method of claim 12, further comprising the step of adapting a passageway to be rotatable with respect to said divider located below said passageway, said rotation of said passageway causing different proportions of powdered resin to flow into the hoppers.

20. The method of claim 12 wherein said powdered resin stream is divided into at least two uniform powdered resin streams.

* * * * *